United States Patent

Needham

[11] 3,889,094
[45] June 10, 1975

[54] RESISTANCE WELDING

[75] Inventor: James C. Needham, Saffron Walden, England

[73] Assignee: The Welding Institute, Abington, Cambridge, England

[22] Filed: May 19, 1969

[21] Appl. No.: 825,586

[30] Foreign Application Priority Data

May 22, 1968 United Kingdom............... 24476/68

[52] U.S. Cl. .................................................. 219/89
[51] Int. Cl. ............................................. B23k 11/16
[58] Field of Search ........................... 219/108–110, 219/86, 89, 78, 80, 119

[56] References Cited
UNITED STATES PATENTS

| | | | |
|---|---|---|---|
| 896,218 | 8/1906 | Lachman | 219/119 X |
| 1,147,783 | 7/1915 | Carter | 219/80 X |
| 1,985,107 | 12/1934 | Roth | 219/108 |
| 2,310,556 | 2/1943 | Strong | 219/86 X |
| 2,382,711 | 8/1945 | Hagedorn | 219/86 |
| 2,863,986 | 12/1958 | Mecklenberg | 219/86 X |
| 3,400,242 | 9/1968 | Waller | 219/110 |

*Primary Examiner*—J. V. Truhe
*Attorney, Agent, or Firm*—Kemon, Palmer & Estabrook

[57] ABSTRACT

In resistance welding workpieces by holding them together under pressure between electrodes and passing current between the electrodes and through the workpieces, the load exerted through the electrodes on the workpieces is substantially increased, during the weld, as a function of the movement of separation of the electrodes which is caused by expansion of the weld metal. If the electrode load increases, due to a high rate of heating, the effective heating is reduced.

4 Claims, No Drawings

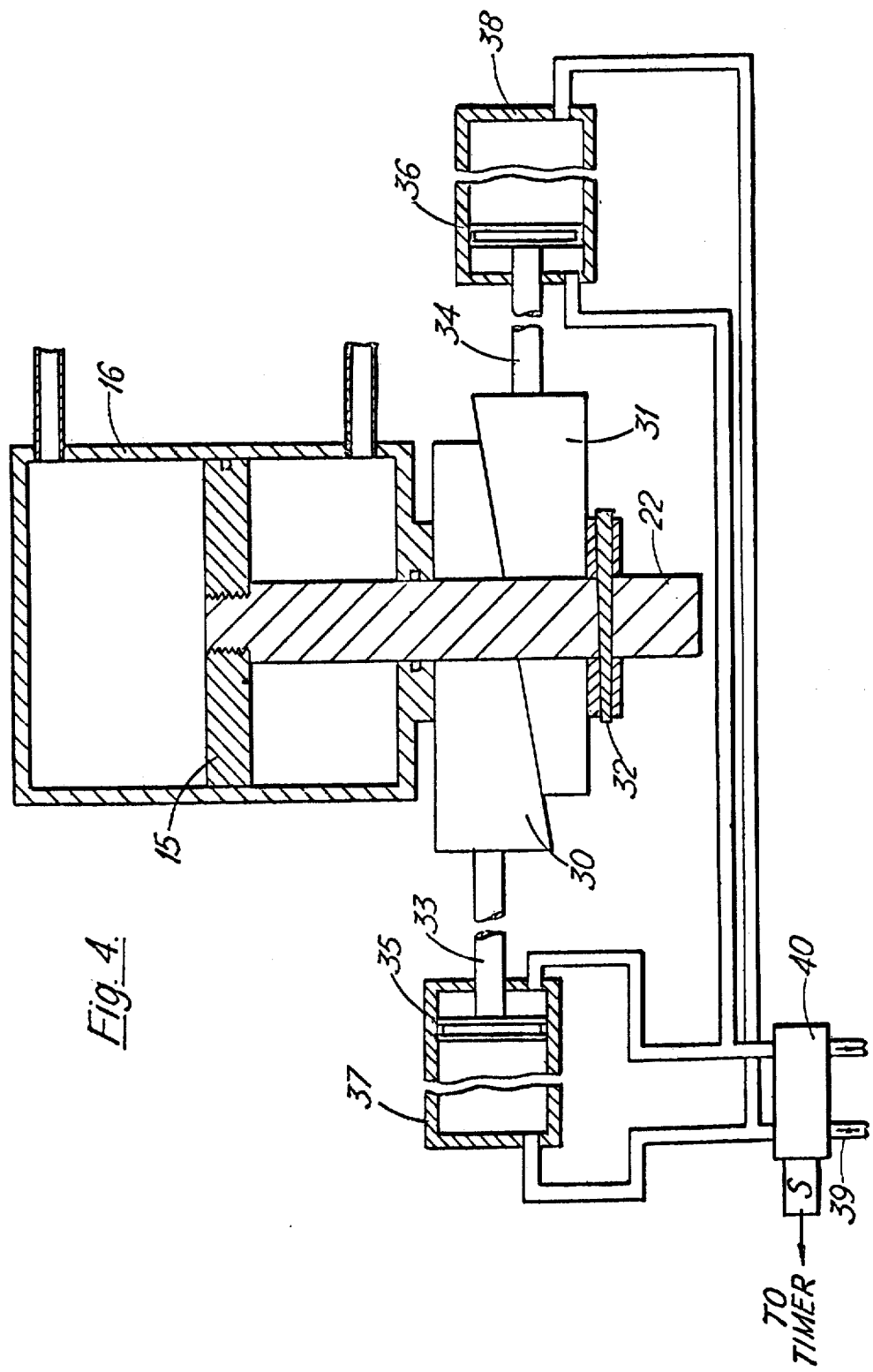

RESISTANCE WELDING

In resistance welding, two workpieces are brought together under pressure and a high current is passed to heat the workpieces at their interface and to weld them together. In normal practice, the applied load, current and weld cycle duration are determined in advance for a particular welding operation, in dependence on (among other things) the material to be welded and the diameter of the electrode tips. These parameters are normally held constant, as far as is possible, from weld to weld and during the formation of any individual weld. Under normal conditions, the welding electrodes are forced to move apart due to the expansion associated with the thermal heating of the material to be welded, the formation of a liquid nugget and the thermal expansion associated with the electrodes themselves. This total expansion typically amounts to 0.01 inch for steel sheets of 0.036 inch thickness, with electrode tips of 0.20 inch diameter.

Even when the applied load, current and duration are held substantially constant, there is a considerable variation of weld quality due to such factors as surface condition of the workpieces, electrode wear, and the shunting effect of alternative current paths through the workpieces. For this reason, quality monitoring or further quality control is highly desirable.

It has been known for many years to use the amount of expansion to monitor the quality of weld. In our British Pat. No. 1,014,133, we have described the use of the rate of expansion of the weld metal, in the initial period of the weld cycle, to monitor the quality and in some cases to control the welding current or duration after the determination of the initial expansion rate.

It is known that the load applied to the electrodes has an effect on weld quality and for this reason, as stated above, a predetermined constant load is normally specificed for any given weld. According to the present invention, the load exerted through the electrodes on the workpieces is substantially increased during the weld as a function of the movement of separation of the electrodes due to expansion of the weld metal. The effect of the load applied to the electrodes on the formation of the weld nugget is that with low applied loads the heating is more rapid than with high applied loads; this is because with high applied loads a better contact and a greater contact area is achieved between the electrodes and the workpieces. In a simple use of the invention, the natural expansion of the weld metal can be restricted by making the expansion of the weld metal result in an increase in the load applied to the electrodes. As an example, the electrodes can be brought into contact with the workpieces under a light load and then locked in position mechanically, hydraulically or electrically so that movement apart is constrained. The electrode support system then acts as a spring of high rate. If the rate of heating is too high and the weld nugget develops rapidly (so that a splashed weld would normally result) a higher electrode load is developed and this tends to reduce the effective heating and also tends to contain the nugget and prevent a splash. Conversely, if the rate of heating is less than normal, the reduced expansion causes a low electrode load to be maintained and this in turn encourages the formation of a weld.

It will be appreciated that in the method according to the present invention the load exerted on the workpieces is substantially increased during the weld as a function of the weld expansion. In conventional welding methods the pressure indicated is constant throughout the weld, although with more precise measuring systems it is possible to register a very slight increase in pressure, probably due to friction between the moving parts as the electrode movement takes place. However, the order of such pressure increase is less than 5% and the substantial increase in pressure in a method embodying the present invention is at least 30% and preferably 100%. In cases, the pressure may rise by 500% in the course of a weld, or even more In order that the invention may be better understood, some examples of apparatus embodying the invention will now be described with reference to the accompanying drawings. In the drawings:

FIG. 4 shows an alternative apparatus for mechanically clamping the moveable electrode;

Figure 1:
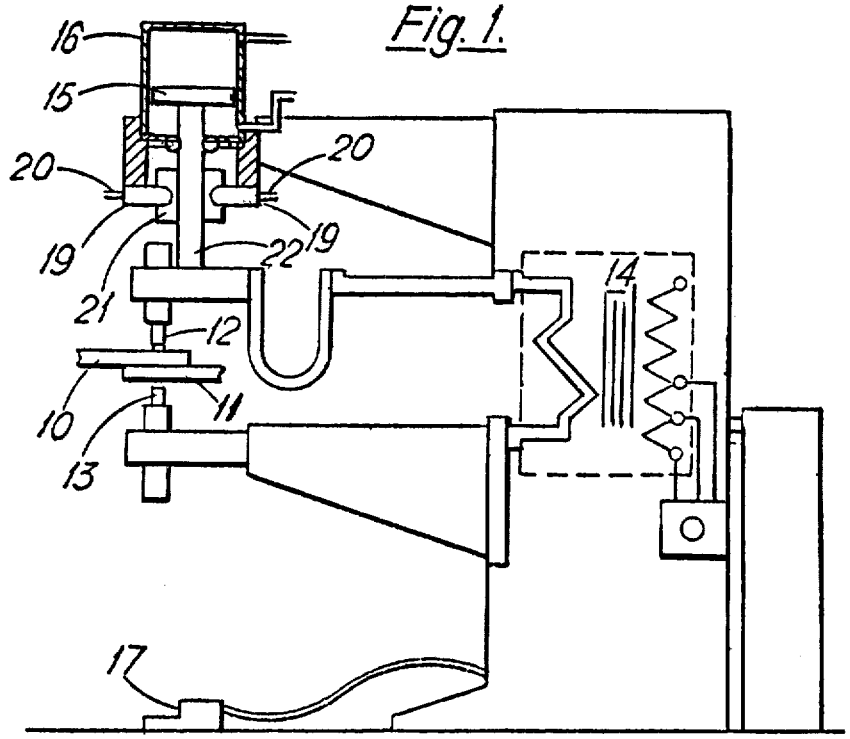
FIG. 1 shows a first form of apparatus embodying the invention.

In FIG. 1 two superimposed workpieces 10 and 11 are held under pressure between two electrodes 12 and 13 connected to the terminals of the secondary of a welding transformer 14. The electrode 13 is fixed in place. The electrode 12 is movable towards and away from the workpieces. To effect a weld the electrode 12 is moved into contact with the upper workpiece, as shown in the drawing, by a piston 15 operating in an air cylinder 16. A foot switch 17 initiates the welding operations.

Normally, the air system supplying the cylinder 16 is such as to maintain a constant load on the electrode 12 in spite of the expansion of the workpieces between the electrodes in the course of the weld. In FIG. 1, disc brakes are arranged to clamp the piston, once the initial load has been set, so that expansion of the weld metal between the electrodes results in increased load. The disc brakes comprise brake shoes 19 connected through pipes 20 to a hydraulic actuating system (not shown). Each shoe extends on each side of a plate 21 attached to the piston rod 22 so that when the disc brakes are actuated the plate 21 is clamped in position and consequently the piston rod 22 is held stationary relative to the remainder of the electrode support. This gives a locked but compliant electrode support.

Figure 2:
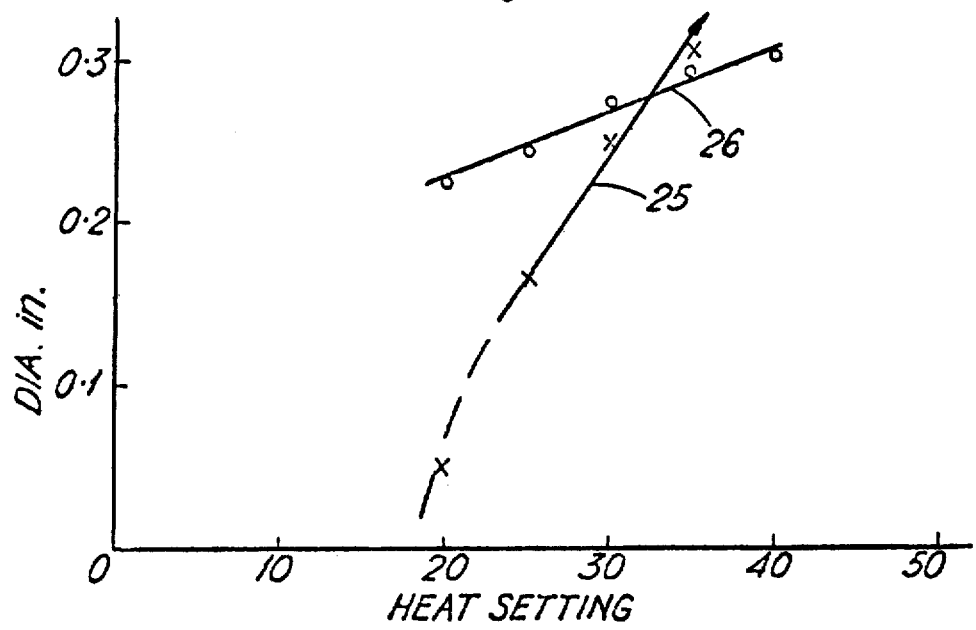
FIGS. 2 and 3 are graphs illustrating the advantages brought about by the present invention.

We have carried out tests comparing the conventional welding method, in which a free electrode support is provided, with a method permitting a restricted expansion and using a locked but compliant electrode support. FIG. 2 is a diagram showing a comparison between the two methods for 16 s.w.g. mild steel, employing an electrode tip face of 0.25 inch diameter. Results for the conventional welding system are shown by line 25 and results for the system employing a locked electrode are shown by line 26. For the convention welding method the applied load was 500 lbs. The heat settings on the welding machine were varied from a low value of 20 (which resulted in a small weld nugget or no weld nugget at all) to a high value of 35 where weld splashing occurred. With the locked electrode system, for which the initial load was 150 lbs a relatively wide range of heat settings resulted in a variation of weld nugget diameter which was only about one quarter of the variation with the conventional welding method.

We find that the weld quality is also relatively insensitive to the pressure at the start of the weld period. The effect of reducing the initial load further is to displace the line 26 to the left without greatly altering its slope. Correspondingly, a higher initial load requires a high heat setting to produce a nugget of the same size.

Figure 3:
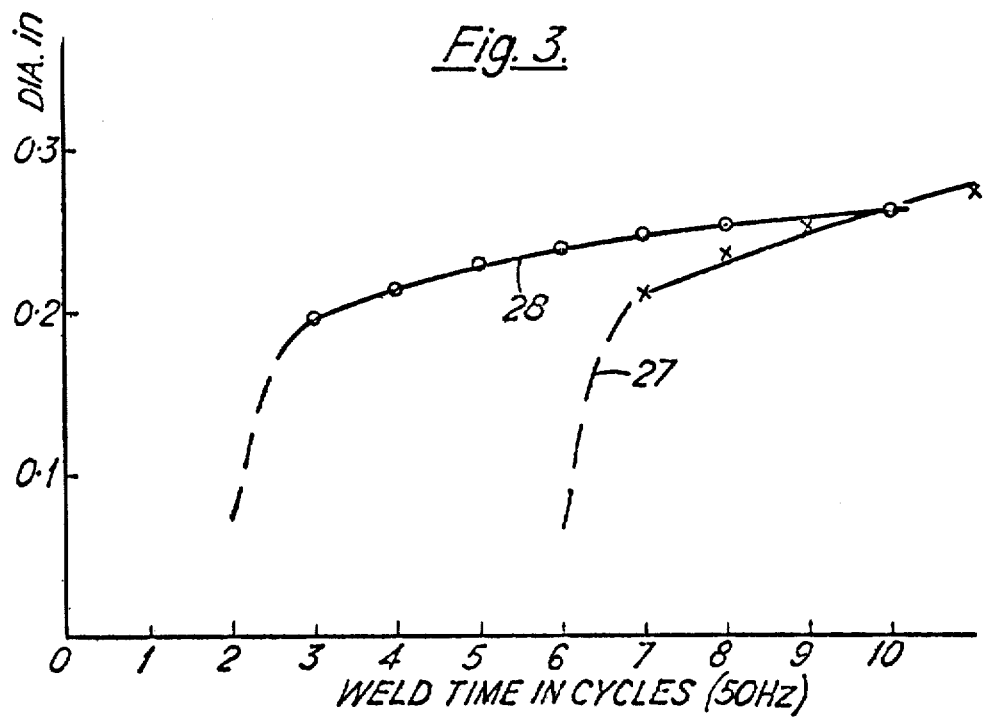

FIG. 3 shows that resistance welding methods embodying the present invention are much more tolerant of weld duration than conventional resistnace welding methods. FIG. 3 shows the relationship between nugget diameter and weld time in cycles of 50 Hz for a weld produced by a convention welding method (curve 27) and a weld produced by a method embodying the invention (curve 28). The material used in each case was 16 s.w.g. mild steel with an electrode face of 0.25 inch diameter and with a fixed load of 500 lbs. for the conventional or free system and an initial load of 70 lbs. only for the restricted electrode arrangement employed for carrying out the present invention. With a fixed current amplitude, for the conventional system a minimum of 6 cycles was required before an appreciable weld nugget was developed at the interface, after which the development of the nugget was very rapid. In the restricted electrode system, the development of the nugget is less sensitive to changes in weld duration. An appreciable nugget is formed under the light pressure after only two or three cycles and variation of weld duration between four and ten cycles produces little change in the weld nugget diameter. This tolerance is due to the major increase in electrode load as the nugget attempts to increase in size with increase in weld duration. Typically, for the materials, and dimensions used to obtain the characteristic 28 of FIG. 3, the average pressure during the weld may increase from 280 lbs. when the weld nugget diameter is 0.2 inch to 500 lbs. when the weld nugget diameter is 0.25 inch.

FIG. 4 shows an alternative mechanical locking arrangement to prevent free movement of separation of the electrodes. In FIG. 4, mechanical wedges 30 and 31 are inserted between the bottom of the air cylinder 16 and a plate 32 carried by the piston rod 22. The electrode (not shown) is attached to the lower end of the rod 22. The wedges 30 and 31 are connected to actuating rods 33 and 34 fixed to pistons 35 and 36 in pneumatic cylinders 37 and 38. The air-operated piston 15 is used to bring the electrodes together and the small air-operated pistons 35 and 36 are then used to insert the wedges, the actuating air being supplied by way of pipe 39. A solenoid-operated valve 40 holds the pistons in place until the solenoid is released by a weld timer of conventional design. It will be appreciated that in the arrangements shown in FIGS. 1 and 4 compliance is provided by the machine frame. Typically, this may amount to between 50 lbs. and 100lbs. per 0.001 inch displacement.

Figure 5:
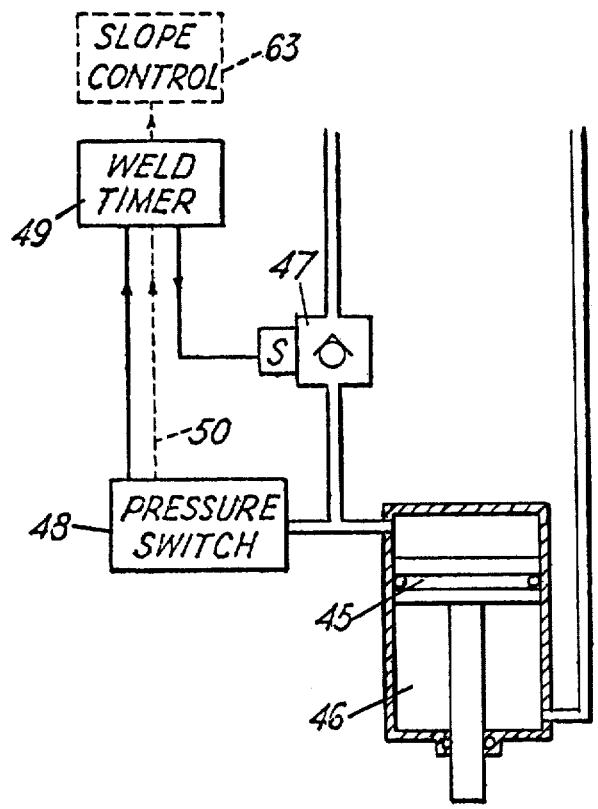
FIG. 5 illustrates hydraulic apparatus for clamping a moveable electrode.

FIG. 5 shows a hydraulic arrangement for locking the electrode with respect to its support. A piston 45 slides within a cylinder 46. The initial load and the clamping together of the electrodes on the work is provided by an oil supply through a solenoid-operated non-return valve 47 at the required pressure. When the electrodes contact the work, pressure is built up in the hydraulic fluid and at the selected initial load a pressure switch 48 closes and initiates a weld timer 49. As expansion takes place the piston 45 moves upwards and the non-return valve closes, so that the electrode load increases with workpiece expansion. The weld can be terminated after a constant weld time, the timer 49 than also supplying a signal to the solenoid of the valve 47 to release or by-pass the non-return valve and thereby permit the electrodes to be moved apart when oil is supplied to the underside of the piston. If desired, the termination of the weld can be brought about by a signal from the pressure switch 48 when the pressure reaches a predetermined value, this signal being applied over line 50 to the weld terminating circuit.

In another form, a double-ended hydraulic ram can be used to lock the conventional air-operated electrode positioning system, a solenoid-operated valve being used to control transfer of hydraulic fluid between opposite ends of the hydraulic cylinder. The solenoid-operated valve is controlled by the machine starting and terminating circuits.

The self-correcting action described above can be carried out without limiting the expansion so severely. For example, instead of restricting expansion from the beginning of the weld, a finite amount of "backlash" can be permitted before the main restriction is encountered. The locked but compliant electrode mounting is equivalent to placing a spring of high rate behind the electrode, the slope of the load/expansion characteristic depending upon the rate of the equivalent spring. If a finite amount of initial backlash is permitted, this characteristic begins with a portion parallel to the expansion axis.

Figure 6:
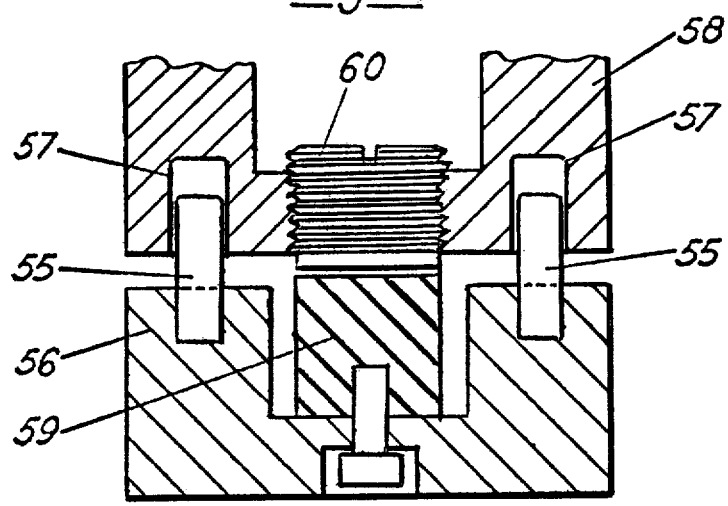
FIG. 6 shows a mechanical device providing different compliances in the course of a weld.

One way of introducing such backlash is shown in FIG. 6 of the accompanying drawings. This shows a mechanical device introduced between the electrode and the locking system. Guide pins 55 on a block 56 slide in recesses 57 in a block 58. The block 56 has a central recess housing a resilient block 59. The size of the block 59 is such that when the block 56 is pushed upwards by the expansion of the workpieces, the resilient block 59 is the first to contact the lower surface of the block 58. In the example shown, it contacts an adjusting screw 60. The compliance provided by the resilient block is high, giving a low increase in electrode load with initial expansion. When the main block is contacted the compliance becomes substantially that of the machine or electrode supports. Alternatively, cantilever arms can be so arranged in relation to a neighbouring surface that on workpiece expansion the free ends of the arms first contact the surface to provide high compliance until contact is made between the fixed portions of the cantilever arms and the said surface.

The manner in which the load varies with expansion depends upon the particular application of welding which is under consideration. For some purposes, it might be required to change the slope of the load-expansion characteristic two or more times in the course of a weld. The load may progressively increase with expansion or in some cases it may be desirable to limit the maximum load developed at the electrode to prevent excessive surface identation or distortion of the weld. In other cases a high initial load can be used to ensure good "fit" between the electrode and the workpiece or to overcome variations in surface contact resistance, the load being reduced to a low value at an early stage in the weld cycle and thereafter increasing as a function of expansion as already described.

To provide a range of compliances to suit a wide range of welding applications, loaded capsules or diaphragm arrangements can be inserted between the work to be welded and the point of mechanical constraint. In a hydraulic system, the maximum pressure developed can be limited by means of relief valve and a sequence of pressure levels and rates of pressure rise with expansion can readily be incorporated by additional control valves switched by pressure-sensitive devices. The hydraulic method of applying load to the electrodes lends itself to the use of different "spring rates" in the course of the weld. When a high initial load followed by a load reduction is required, prior to the progressive load increase with expansion, a valve can be opened after the initial period of high liquid pressure to relieve some of the hydraulic liquid into a small cavity and thereby to reduce the effective load.

Figure 7:
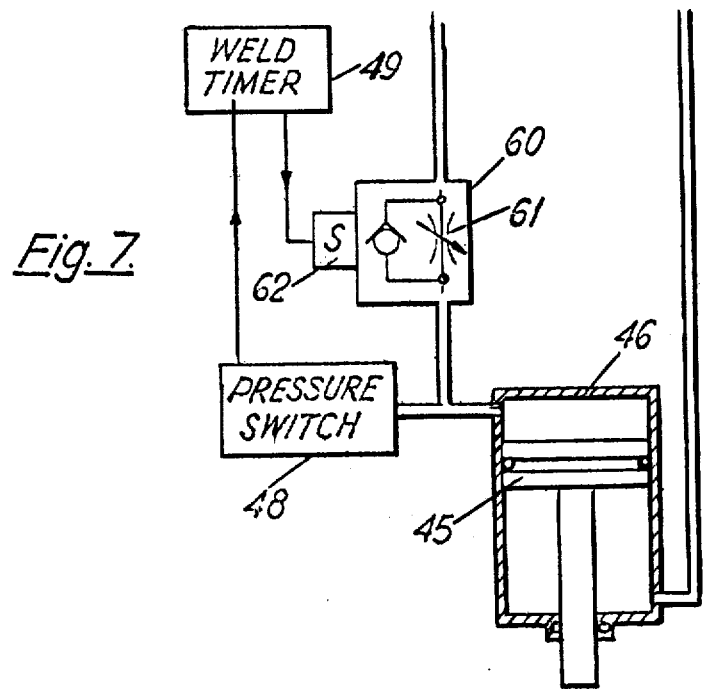
FIG. 7 shows an alternative form of hydraulic apparatus embodying the invention.

In the hydraulic arrangement shown in FIG. 7, the increase in load is related to the rate at which workpiece expansion takes place. Such expansion moves the upper electrode and with it the piston 45 and causes liquid to be expelled from the upper portion of the cylinder 46 to a combined throttle and non-return valve 60. The controlled constriction 61 in the latter results in a pressure increase across the constriction which is a function of the rate of liquid flow from the cylinder. For this reason, the effective electrode load is related to the rate of expansion of the workpieces, a high rate causing increased load and consequent reduction of rate of nugget growth, as explained above, and a low rate causing decreased load and encouraging nugget formation. For the clamping and unclamping movement of the electrodes, the constriction and non-return valve are by-passed in response to energisation of a solenoid 62 by a signal from the weld timer 49. As in FIG. 5, a pressure switch 48 is used to provide a signal for initiating the weld.

We have thus described automatic control of the nugget development by electrode load in response to weld expansion. As indicated in FIG. 5, the change in electrode load can be used to control the weld duration and this is advantageous because the invention encourages the early development of the weld nugget. The expansion which causes the change in electrode load can be used to control the weld duration, as an alternative. In a modification, a signal from the pressure-sensitive switch 48 of FIG. 5, indicating that a given load has been reached, may operate a timing circuit which permits the weld to continue for a period which is a function of the time taken to reach the pressure level which actuated the switch 48.

In a further possibility, the weld may be terminated when the amount of expansion reaches a given proportion of a predetermined maximum expansion for the workpieces in question; as an example, the current may be switched off when the expansion reaches 80% of the predetermined maximum.

This early termination of the weld would normally result in a weld nugget of small size but the weld size can be increased to that required by using electrodes which have a tip diameter greater than that normally used for the thickness of material which is being welded. For any thickness $t$ of material, the electrode tip diameter D can be ascertained from standard tables or from a formula. A simple formula which is widely used is $$D = \sqrt{t} \text{ ins. or } D = 5\sqrt{t} \text{ mm.}$$

To increase the nugget size, the electrode diameter given by the above formula can be increased by 20%.

As a further modification, the current amplitude may be varied in the course of the weld. As an example, it may increase progressively from the beginning to the end of the weld by 30% of its mean value in order to compensate for increasing heat losses from the weld area as the temperature of the latter rises. A slope control circuit 63 is shown diagrammatically in FIG. 5. Such circuits are known in themselves, although normally the slope control is used to increase the amplitude of the current only at the very beginning of the weld, this is being done to overcome the effect of irregularities of initial contact.

The invention can, of course, be applied to other forms of welding machine. In a gun welder, the compliance is provided in the two arms supporting the electrodes. A multi-headed welder preferably has a very rigid frame and independent compliance is incorporated in each of the individual heads.

I claim:

1. Apparatus for joining workpieces by resistance welding, comprising:
    a pair of electrodes, at least one electrode being movable to permit the clamping of superimposed workpieces to be joined between the electrodes;
    a source of current for connection across the electrodes; and
    mounting means for the electrodes providing a first compliance in response to small displacements of the electrodes away from one another and a second reduced compliance when the movement of the electrodes away from one another exceeds a predetermined amount, whereby when the second reduced compliance is effective further movement of separation of the electrodes results in the application to the electrodes of a pressure which varies as a function of the said separation.

2. Apparatus for the resistance welding of workpieces, comprising:
    a pair of electrodes for receiving betweeen them the workpieces to be welded;
    means for applying a predetermined pressure to the electrodes to clamp the workpieces between the electrodes;
    a source of current for connection across the electrodes; and
    means responsive to movement of the electrodes away from one another to modify the compliance of the electrode mounting, so that a movement of electrode separation resulting in such modified compliance causes the application of an increased pressure through the electrodes on the workpieces.

3. Apparatus for the resistance welding of workpieces comprising:
    a pair of electrodes for receiving between them the workpieces to be welded;
    means for applying a predetermined pressure to the electrodes to clamp the workpieces between the electrodes;
    a source of current for connection across the electrodes;

and means responsive to movement of separation of the electrodes, due to expansion of the workpieces, to apply to the electrodes a pressure increase of at least 30% during a period of welding current flow whereby the pressure increase in the said period is a function of the workpiece expansion and heat generation within the weld is controlled in accordance with the progress of the weld; and means operative in response to the movement of separation of the electrodes reaching a predetermined magnitude to terminate the weld current.

4. Apparatus for the resistance welding of workpieces comprising:

a pair of electrodes for receiving between them the workpieces to be welded;

means for applying a predetermined pressure to the electrodes to clamp the workpieces between the electrodes;

a source of current for connection across the electrodes;

and means responsive to movement of separation of the electrodes, due to expansion of the workpieces, to apply to the electrodes a pressure increase of at least 30% during a period of welding current flow whereby the pressure increase in the said period is a function of the workpiece expansion and heat generation within the weld is controlled in accordance with the progress of the weld; and means permitting an initial movement of separation of the electrodes due to workpiece expansion through a first range without substantial increase in pressure, the means constraining movement of separation of the electrodes being effective only in response to further electrode separation, due to further workpiece expansion after the completion of the electrode movement through the said first range.

* * * * *